(12) United States Patent
Kim

(10) Patent No.: US 7,027,458 B2
(45) Date of Patent: Apr. 11, 2006

(54) MODEM AND A METHOD FOR CONTROLLING THE SAME

(75) Inventor: Heung-Soo Kim, Kynugki-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 941 days.

(21) Appl. No.: 09/901,154

(22) Filed: Jul. 10, 2001

(65) Prior Publication Data

US 2002/0034192 A1    Mar. 21, 2002

(30) Foreign Application Priority Data

Sep. 19, 2000    (KR) .............................. 2000-54945

(51) Int. Cl.
*H04L 12/28*    (2006.01)
(52) U.S. Cl. ..................... 370/420; 370/465
(58) Field of Classification Search ................ 370/466, 370/467, 503, 509, 545, 310.1, 311, 329, 370/346, 351, 352, 353, 354, 359, 360, 392, 370/401, 419, 420, 422, 465, 496
See application file for complete search history.

(56) References Cited

U.S. PATENT DOCUMENTS

| | | | |
|---|---|---|---|
| 4,701,946 A | 10/1987 | Oliva et al. | |
| 5,408,522 A | 4/1995 | Ikehata et al. | |
| 5,781,617 A | 7/1998 | McHale et al. | |
| 6,023,724 A | 2/2000 | Bhatia et al. | |
| 6,084,873 A * | 7/2000 | Russell et al. | 370/352 |
| 6,084,881 A * | 7/2000 | Fosmark et al. | 370/397 |
| 6,188,669 B1 * | 2/2001 | Bellenger | 370/230 |
| 6,320,867 B1 * | 11/2001 | Bellenger et al. | 370/420 |
| 6,385,203 B1 * | 5/2002 | McHale et al. | 370/401 |
| 6,631,120 B1 * | 10/2003 | Milbrandt | 370/252 |
| 6,633,572 B1 * | 10/2003 | Olshansky et al. | 370/401 |
| 6,667,986 B1 * | 12/2003 | Sullivan et al. | 370/420 |
| 6,674,747 B1 * | 1/2004 | Lassaux et al. | 370/352 |
| 6,697,475 B1 * | 2/2004 | MeLampy et al. | 379/201.12 |

(Continued)

FOREIGN PATENT DOCUMENTS

EP    0 632 629 A1    1/1995

(Continued)

OTHER PUBLICATIONS

D. Macq, et al., "A CMOS activity detector for ADSL Link", Alcatel-Bell, Francis Wellesplein 1, B-2018 Antwerp, Belgium, XP-002119172.

(Continued)

*Primary Examiner*—Phirin Sam
(74) *Attorney, Agent, or Firm*—Sughrue Mion, PLLC

(57) ABSTRACT

A modem and a method for controlling the same. The modem includes a first interface interfacing with a subscriber terminal, a second interface interfacing with a switching system, a detection means detecting a communication connection status with the subscriber terminal and outputting a detection result signal, and a controller processing a data communication between the subscriber terminal and the switching system and controlling the second interface to stop the operations if a non-connection signal is inputted from the detection means. In the present invention, releasing a communication channel with the switching system when the subscriber terminal is in a non-connection status reduces unnecessary power consumption and lengthens the life span of an apparatus. Further, the operations of such subscriber modem can control unnecessary line occupation in a switching system for a plurality of subscriber modems, to reduce power consumption in the switching system and enhance system data processing speed.

23 Claims, 6 Drawing Sheets

U.S. PATENT DOCUMENTS

| | | | |
|---|---|---|---|
| 6,721,356 B1 * | 4/2004 | Cole et al. | 375/22 |
| 6,845,406 B1 * | 1/2005 | Hori et al. | 710/10 |
| 2001/0033583 A1 * | 10/2001 | Rabenko et al. | 370/503 |
| 2002/0031113 A1 * | 3/2002 | Dodds et al. | 370/352 |

FOREIGN PATENT DOCUMENTS

| | | |
|---|---|---|
| EP | 0 898 409 A | 2/1999 |
| JP | 2000-165517 A | 6/2000 |
| JP | 2000-217151 A | 8/2000 |
| JP | 2000-253172 A | 9/2000 |
| JP | 2003-518341 A | 6/2003 |

OTHER PUBLICATIONS

Internet Publication: Efficient Works et al., "SpeedStream 5600 ADSL Router Installation Guide", pp. 11-14, *XP002189944*.

Japanese Abstract No. 2000-217151, dated Aug. 4, 2000.

* cited by examiner

MODEM AND A METHOD FOR CONTROLLING THE SAME

BACKGROUND OF THE INVENTION

1. Field of the Invention

The present invention relates to a modem and a method, and more particularly to a modem and a method for controlling the same, capable of transmitting and receiving data through the installation between a subscriber terminal and a switching system.

The present application is based on Korean Patent Application No. 2000-54945, filed Sep. 19, 2000, which is incorporated herein by reference.

2. Description of the Related Art

Various related art network communication service technologies have been introduced for providing high-speed communication services to users. For example but not by way of limitation, technologies such as the Asymmetric Digital Subscriber Line (ADSL), Bluetooth and Phoneline Network Alliance (PNA) have been applied for the network communication service technologies.

A subscriber modem is installed between a subscriber terminal and a switching system, relaying connections to a public network and performing communication relays between the subscriber terminal and the switching system.

The service method of the ADSL, which is a network communication service technology, can transmit data at a high speed through an existing telephone line. Because the ADSL service method uses the existing telephone lines, ADSL is widely used. Further, ADSL provides a downstream transmission rate of over 8 Mbps and an upstream transmission rate of over 1 Mbps.

Physically, ADSL is classified into a central service part managed with telephone lines connected thereto (e.g., a switching system), and a part for connecting a data backbone network to the central service part and a subscriber service part.

FIG. 1 illustrates an ATM switching system 20 connected to a subscriber terminal 10 through a subscriber's ADSL modem 30 in a general ADSL communication service system. The modem 30 converts data received from the subscriber terminal 10 (e.g., a user's personal computer) into a format required in the switching system 20 and transmits the converted data to the switching system 20. The modem 30 also converts data received from the switching system 20 into a format required in the subscriber terminal 10, and outputs the converted data to the subscriber terminal 10.

The modem 30 also maintains a communication channel with the switching system 20 to process data transmissions and receptions between the switching system 20 and subscriber terminal 10 at any time, regardless of data receptions from the subscriber terminal 10. Accordingly, the modem 30 transmits a signal for maintaining a channel periodically to keep the channel with the switching system 20, and the switching system 20 transmits a signal confirming the maintaining of the channel by the modem 30.

However, the conventional modem 30 has various problems and disadvantages. For example, the conventional modem 30 consumes unnecessary power to maintain a channel with the switching system 20 if the subscriber terminal 10 is in a non-connection status (i.e., powered off), or if the subscriber terminal 10 is in the non-connection status for a long time period when the subscriber terminal 10 does not communicate with an external network via the modem 30. As a result, the life span of the apparatus is shortened due to the above-described unnecessary operations.

Additionally, the driving mode of the conventional modem 30 affects the switching system 20 connected to a plurality of modems 30. The switching system 20 connected to the plurality of subscriber terminals 10 causes unnecessary power losses of the switching system 20, since the switching system 20 processes a signal for maintaining a channel of the plurality of subscriber's modems 30 when the channel maintaining signal is inputted from the plurality of subscriber's modems 30 in the non-connection status with the subscriber terminal 10. Thus, the utilization efficiency of communication lines and communication speed is restrained due to the unnecessary occupation of the communication lines.

SUMMARY OF THE INVENTION

In order to solve the above problems, it is an object of the present invention to provide a modem and a method for controlling the same that reduces unnecessary power consumption by releasing channels from a switching system when the subscriber's terminal is in a non-connection status.

In order to achieve the above object, the modem according to the present invention, in a modem having a first interface for interfacing with a subscriber terminal, a second interface for interfacing with a switching system, and a controller for processing data communication between the subscriber terminal and the switching system, the modem comprises a detection means for detecting a communication connection status with the subscriber terminal and outputting a detection result signal, wherein the controller controls the second interface to stop operations of the second interface if a non-connection signal is inputted from the detection means.

A modem in another preferred embodiment of the present invention comprises a detection means for detecting a communication connection status with the subscriber terminal, and outputting a connection signal or a non-connection signal according to the detection result; and a switching device for turning on and off a supply of electric power to the second interface from a power supply according to an input of the connection signal or the non-connection signal.

Furthermore, a modem in yet another preferred embodiment of the present invention comprises a detection means for detecting a communication connection status with the subscriber terminal, and outputting a connection signal and a non-connection signal according to the detection result, wherein the second interface stops the operation thereof if the non-connection signal is inputted from the detection means and releases a communication channel with the switching system.

Preferably, the detection means detects whether a signal is transmitted to the first interface from the subscriber terminal, and outputs the non-connection signal if a non-transmission status of the signal lasts a predetermined time period.

Further, the detection means detects whether a synchronization signal is inputted for matching a data transmission speed from the subscriber terminal, and generates the non-connection signal if the non-input status of the synchronization signal lasts a predetermined time period.

Furthermore, in order to achieve the above object, there is provided a method for controlling a modem according to the present invention, in a method for controlling a modem having a first interface for interfacing with a subscriber terminal, a second interface for interfacing with a switching system, a detection means for detecting a communication connection status with the subscriber terminal, and a controller for processing a data communication between the subscriber terminal and the switching system, that comprises steps of judging the communication connection status with the subscriber terminal; and stopping the operation of the second interface if judged as a non-connection status in the connection judgement step.

BRIEF DESCRIPTION OF THE DRAWINGS

The above object and other advantages of the present invention will become more apparent by describing in detail a preferred embodiment thereof with reference to the attached drawings, in which.

DETAILED DESCRIPTION OF THE PREFERRED EMBODIMENTS

Hereinafter, modems and methods for controlling the same according to the embodiments of the present invention will be described in detail with reference to the accompanying drawings.

Figure 1:
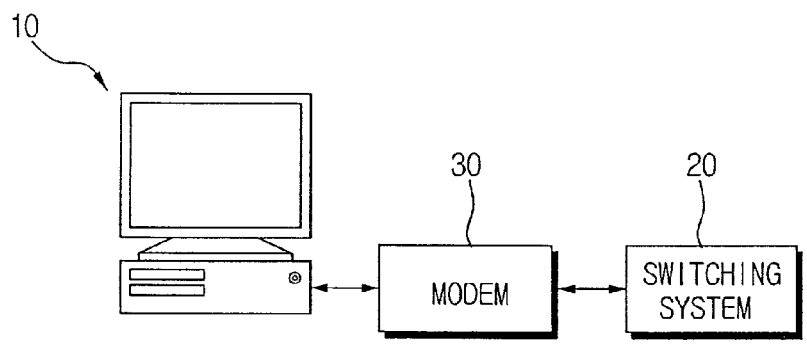
FIG. 1 is a block diagram for showing the connection of subscriber's terminal with an ATM switching system through ADSL modem in a general ADSL communication service system.
Figure 2:
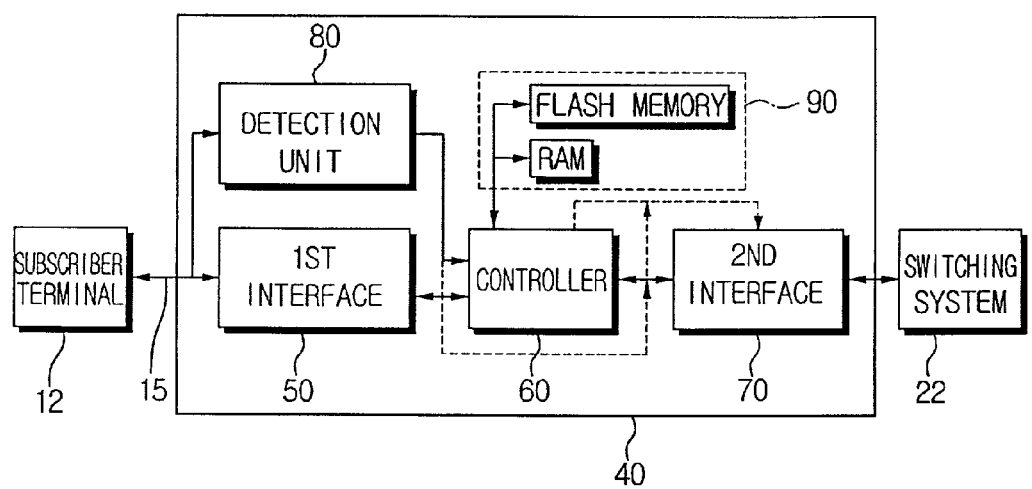
FIG. 2 is a block diagram for showing a modem according to a first embodiment of the present invention.

FIG. 2 is a block diagram for showing a modem according to a first preferred embodiment of the present invention. A subscriber's modem 40 is connected between a subscriber terminal 12 and a switching system 22. The modem 40 includes a first interface 50, a second interface 70, a subscriber terminal connection status detection unit 80, a storage unit 90, and a controller 60. A communication interface 15 (e.g., wired or wireless communication) is coupled between the subscriber terminal 12 and the modem 40.

The communication interface 15 and the modem 40 perform a data process suitable for an applied subscriber's terminal 12 and an applied communication service type. The first interface 50 processes data transmissions and receptions together with the subscriber's terminal 12, and is adapted to interface with the subscriber terminal 12 using a communication type (e.g., Ethernet, Universal Serial Bus (USB), Phoneline Network Alliance (PNA), Bluetooth, wireless LAN, and Home RF).

The second interface 70 processes data transmissions and receptions together with the switching system 22. Various programs (e.g., a booting program or an application program) are stored in the storage unit 90 for supporting communications regarding a set communication type. The storage unit 90 may be constructed with one or a plurality of memories. In the first preferred embodiment of the present invention, the storage unit 90 is constructed with a flash memory for storing the booting and application programs, and a RAM for temporarily storing data.

The subscriber terminal connection status detection unit 80 detects a connection status of the subscriber terminal 12, and outputs a connection signal when determining a connection status and outputs a non-connection signal when determining a non-connection status. The subscriber terminal connection status detection means 80 detects whether a signal is received from the subscriber terminal 12 to the first interface 50, and outputs the non-connection signal if a non-reception status of the signal lasts for a predetermined time period.

For example but not by way of limitation, the detection means 80 of the connection status of the subscriber terminal detects whether a synchronization signal is inputted from the subscriber terminal 12 to synchronize a data transmission speed and generates a non-connection signal if a non-input status of the synchronization signal lasts for a predetermined time period.

Figure 3:
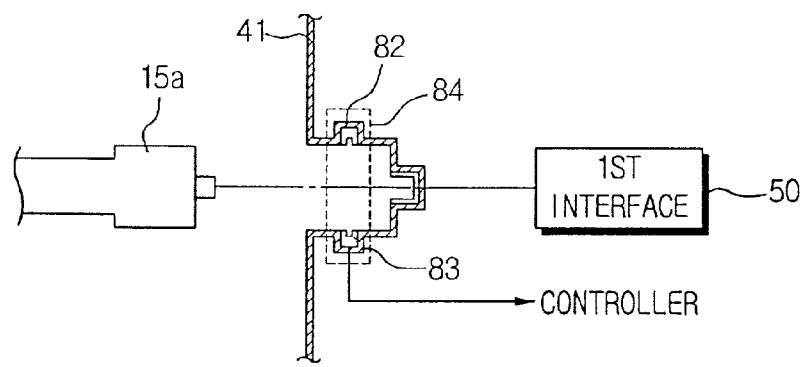
FIG. 3 is a view for showing a detection means of the connection status of the subscriber terminal applied to a modem according to the first embodiment of the present invention.

FIG. 3 illustrates the detection means 80 according to the first preferred embodiment of the present invention. If the applied communication interface 15 is a communication cable, the detection means 80 of the connection status of the subscriber terminal generates a connection signal by an interference of the communication cable, which is matched with a connector in an inlet groove of a main body in which the connector is mounted to be connected with the first interface 50. The detection means 80 outputs a non-connection signal when the communication cable is separated from the connector.

As shown in FIG. 3, a connection judgement part 84 includes a light source 82 and a light detection part 83 mounted in a direction of traversing a matching position of the communication cable 15a in the inlet groove of the main body. An output signal corresponding to light-reception/light-non-reception of the light detection part 83 is a connection/non-connection signal.

Alternatively, the connection judgement part 84 generates a connection or a non-connection signal by a contact switch mounted to generate a connection signal by a direct interference due to a contact of the communication cable 15a inserted to the matching position.

The controller 60 analyzes and processes data received through the first interface 50 or the second interface 70, and performs a normal data process if a connection signal is received from the subscriber terminal connection status detection unit 80. The controller 60 outputs an operation stop signal to the second interface 70 to stop the operation of the second interface 70 if a non-connection signal is inputted from the subscriber terminal connection status detection unit 80. The second interface 70 inputs the operation stop signal through a control signal line (indicated by a dotted line) separately from a data bus line connected to the controller 60. In this case, the second interface 70 includes an input terminal for inputting an operation stop signal or an operation start signal from the controller 60.

The second interface 70 controlled by the controller 60 releases a channel from a switching system 22 if the operation stop signal is inputted through the solid-line data bus line or the dotted control signal line. The second interface 70 does not perform a signal transmission for maintaining the channel to the switching system 22 if the operation stop signal is inputted.

Further, the second interface 70 performs an operation stop and an operation start through a direct reception of an output signal of the detection means 80 of the connection status of a subscriber terminal without passing through the controller 60. The detection means 80 of the connection status of a subscriber terminal outputs a connection signal or a non-connection signal to the second interface 70 through a path indicated in a dotted line, and the second interface 70 stops the operation thereof if the non-connection signal is inputted. A power supply (not shown) supplies power to respective components.

Figure 4:
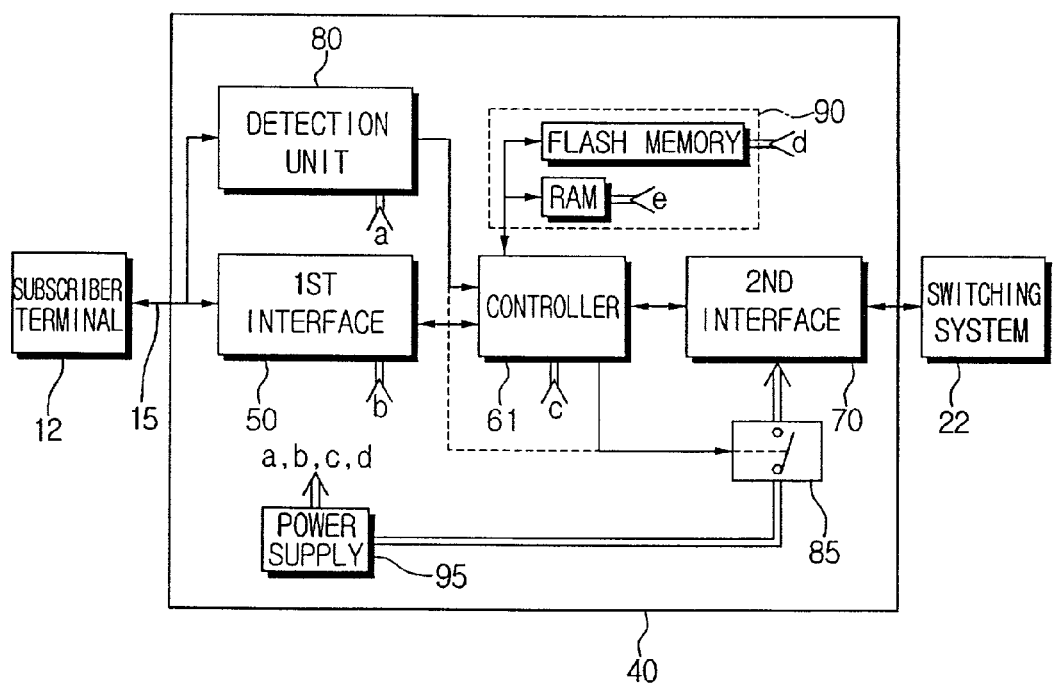
FIG. 4 is a block diagram for showing a modem according to a second embodiment of the present invention.

FIG. 4 is a block diagram for showing the modem 40 according to a second embodiment of the present invention. The same components having substantially similar functions to those in FIG. 2 will be indicated in the same reference numerals.

A modem 40 includes a switching device 85 that transits between an off position and an on position the supply of electric power to an electric power supply path connected from a power supply 95 to the second interface 70. The switching device 85 is directly or indirectly associated with the connection signal or the non-connection signal outputted from the detection means 80 of the connection status of a subscriber terminal. An output signal of the subscriber terminal connection status detection unit 80 is outputted to a controller 61 that connects respective components to control the switching device 85. The controller 61 controls the switching device 85 transited to the "off" position if the non-connection signal is generated and cuts off the power supply to the second interface 70.

In another preferred embodiment of the present invention, the respective components are connected for the switching device 85 to be directly transited on and off by the output signal of the detection means 80 of the connection status of a subscriber terminal. The power supply is supplied or not supplied to the second interface 70 according to the output signal of the detection means 80 of the connection status of a subscriber terminal regardless of the controller 61, which is effectively bypassed.

In FIG. 4, reference characters a, b, c, d, and e indicate power supply lines extended from the power supply 95 to the respective components having the corresponding reference numerals.

Figure 5:
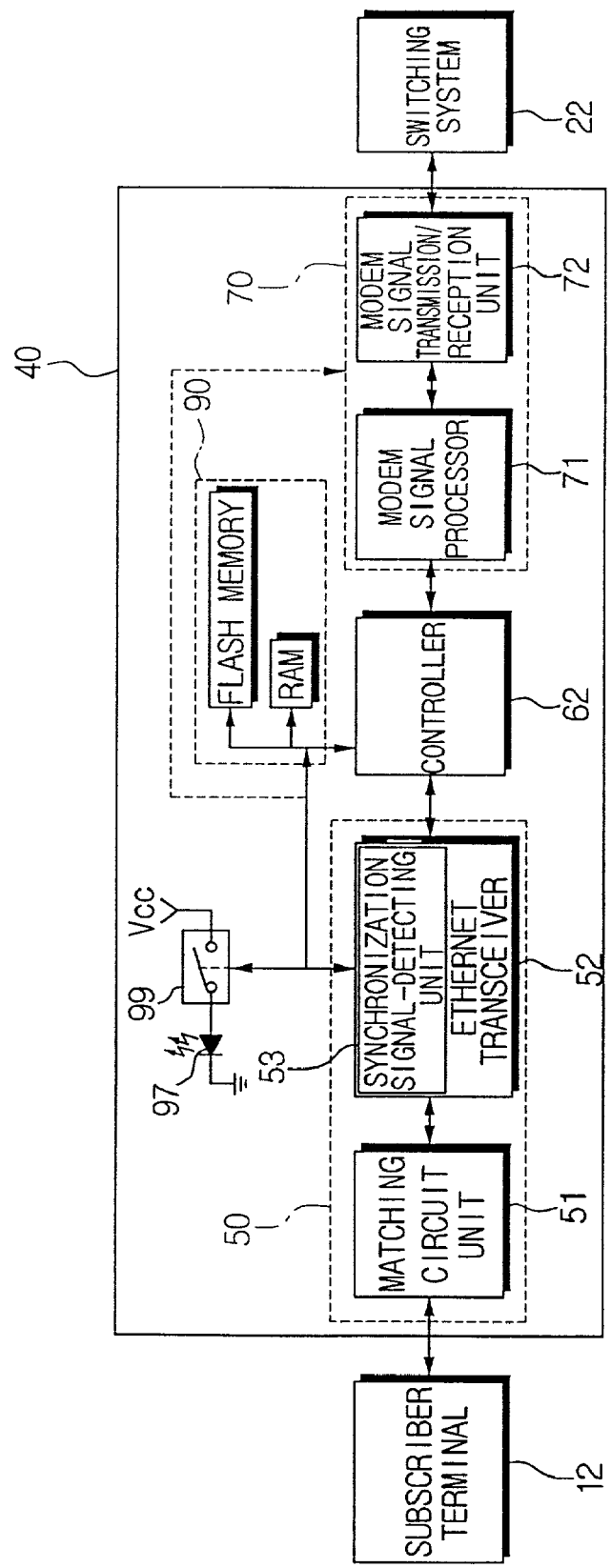
FIG. 5 is a block diagram for showing a modem according to a third embodiment of the present invention.

FIG. 5 shows the modem 40 according to the third preferred embodiment of the present invention, which is applied to an ADSL communication service system. The first interface 50 of the modem 40 includes a matching circuit unit 51 and an Ethernet transceiver 52. The matching circuit unit 51 is constructed for an impedance matching regarding the communication interface with the subscriber terminal 12. Preferably, a filter circuit (not shown) receives and removes noise in the matching circuit unit 51. The Ethernet transceiver 52 and the subscriber terminal 12 transmit and receive an Ethernet data packet. The second interface 70 includes a modem signal process unit 71 and a modem signal transmission/reception unit 72. The modem signal process unit 71 converts an ATM cell received to be fit for a frame format required in a controller 62 and an ATM switching system 22, and outputs the converted ATM cell to a corresponding path.

The modem signal transmission/reception unit 72 converts a digital signal received from the modem signal process unit 71 into an analog signal, outputs the analog signal to the switching system 22, converts an analog signal received from the switching system 22 into a digital signal, and outputs the digital signal to the modem signal process unit 71.

A light-emitting device 97 mounted on the exterior of the main body is for a connection status indication for a user's recognition, and a switching device 99 is adapted to transit on and off the supply of electric power to the light-emitting device 97 from a power supply Vcc.

A synchronization signal-detecting unit 53 applied as a detection means of the connection status of a subscriber terminal, mounted in an Ethernet transceiver 52, detects a synchronization signal of a preamble region for the transmission speed matching in an Ethernet data packet received from the subscriber terminal 12, judges whether a normal communication is possible, and outputs a judgment result signal.

The output signal of the synchronization signal-detecting unit 53 (e.g., a connection signal or a non-connection signal) is outputted to the controller 62 or the second interface 70 according either to the indirect control embodiment or to the direct control embodiment described above. Further, the output signal of the synchronization signal-detecting unit 53 is outputted to the switching device 99 for controlling the light-emitting device 97.

Accordingly, the light-emitting device 97 is transited to the "on" position by the switching device 99 if the connection signal is inputted from the synchronization signal-detecting unit 53, and a normal data communication is performed with the subscriber terminal 12 and the ATM switching system 22 by the respective components.

Alternatively, the light-emitting device 97 is transited to the "off" position by the switching device 99 if the non-connection signal is inputted from the synchronization signal-detecting unit 53, and the operation of the second interface 70 is stopped.

FIG. 5 shows a circuit in which the second interface 70 receives a control signal regarding whether a connection is made or not and the driving thereof can be stopped. Alternatively, the circuit may be constructed to transit off the power supply to the second interface 70 from the power supply by the non-connection signal as described above with respect to FIG. 4.

Further, the construction capable of controlling the transiting of the light-emitting device 99 for the connection status indication through the output signal of the detection means 80 of the connection status of a subscriber terminal may be applied with respect to FIG. 2 and FIG. 3.

Figure 6A:
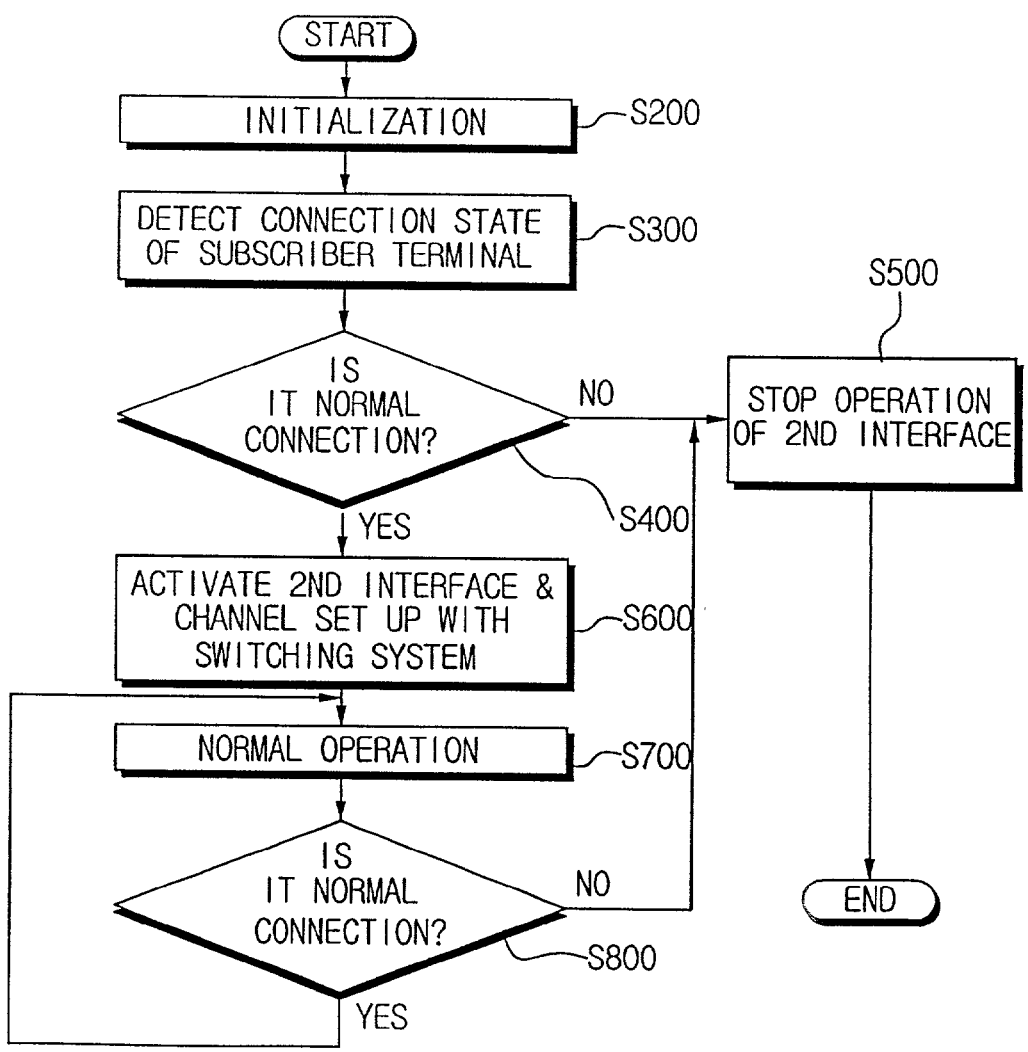
FIG. 6A is a flow chart for showing a modem control process according to a preferred embodiment of the present invention.
Figure 6B:
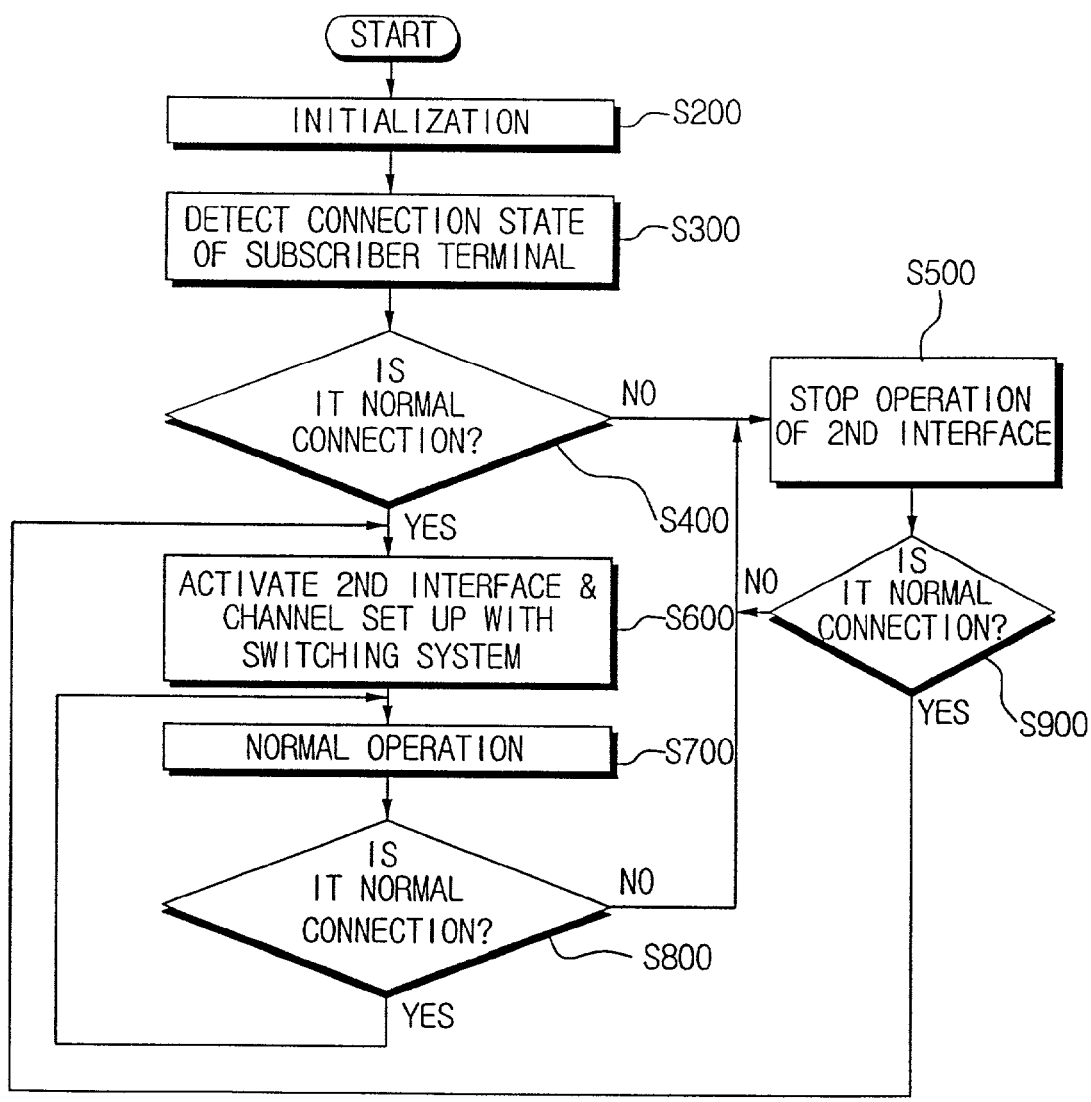
FIG. 6B is a flow chart for showing a modem control process according to another preferred embodiment of the present invention.
Figure 7:
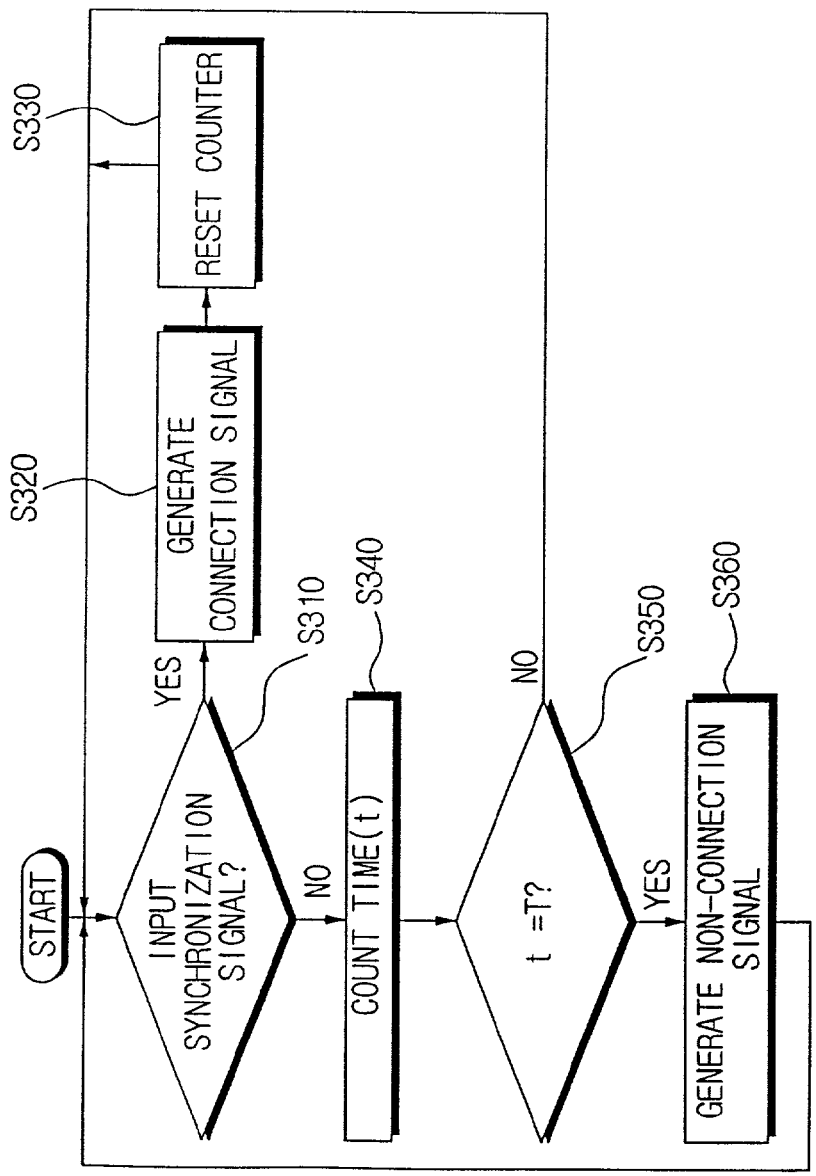
FIG. 7 is a flow chart for showing an example of detection process of the connection status of the subscriber's terminal according to the third preferred embodiment of the present invention.

FIG. 6A and FIG. 6B illustrate flow charts for showing modem control processes according to the embodiment of the present invention, and FIG. 7 illustrates a flow chart for showing an example of a detection process of the connection status of a subscriber terminal in FIGS. 6A and 6B.

In a first step S200, the modem 40 performs an initialization process if power is inputted. The initialization process performs a booting program, and includes a series of steps for loading an application program stored in the storage unit to perform a data process on an execution protocol stack. Preferably, the initialization process stops the driving of the second interface 70.

If the initialization process is completed, the connection status of the subscriber terminal 12 is detected in a second step S300. FIG. 7 illustrates an example of the detection step of the connection status of a subscriber terminal. In a first step S310, it is determined whether a synchronization signal is inputted from the subscriber terminal 12. If the synchronization signal is inputted in step S310, the connection signal is generated in the next step S320 and a counter is reset in a subsequent step S330.

If the synchronization signal is not inputted, time is counted in a next step S340. Then, it is determined whether the counted time t reaches a predetermined time T in a following step S350.

If the counted time t in step S350 does not reach the predetermined time T, the step S310 is repeated. However, if the counted time t in step S350 reaches the predetermined time T for judging the non-connection, the connection signal is converted into the non-connection signal and the time count is stopped in the next step S360. The step S310 is repeated after step 360. The steps of FIG. 7 are continuously performed during the application of power.

As illustrated in FIG. 6A and FIG. 6B, the connection status is determined based on information on the detection result of the connection status of step S300 in a subsequent step S400.

If a normal connection is determined in step 400, the activation of the second interface 70 forms a driving start and a communication channel with the switching system 22 in step S600.

If the communication channel with the switching system 22 is set up, a normal operation is performed for processing a data communication between the subscriber terminal 12 and the switching system 22 in step S700. However, if judged in the non-connection status in step S400 or step S800, the operation of the second interface 70 is stopped in step S500.

As shown in FIG. 6B, according to the result of determining whether there is a normal connection status in step S900 after stopping the operation of the second interface 70, step S600 is repeated.

The present invention has various advantages. For example but not by way of limitation, releasing a communication channel from a switching system as a communication connection status with a subscriber terminal that is in a non-connection status can suppress unnecessary power consumption and extend the life span of the apparatus. Further, the subscriber modem can suppress the unnecessary line occupation in the switching system supporting communication services with respect to a plurality of subscriber modems, thereby reducing power consumption in the switching system and enhancing a data processing speed of an entire communication system.

Although the preferred embodiments of the present invention have been described, it will be understood by those skilled in the art that the present invention should not be limited to the described preferred embodiments, but various changes and modifications can be made within the spirit and scope of the present invention as defined by the appended claims.

What is claimed is:

1. A modem comprising:
   a first interface interfacing with a subscriber terminal;
   a second interface interfacing with a switching system;
   a detector detecting a communication connection status with the subscriber terminal and outputting a detection result signal; and
   a controller processing data communication between the subscriber terminal and the switching system, and controlling the second interface to terminate operations of the second interface if a non-connection signal is inputted from the detector.

2. The modem as claimed in claim 1, wherein the detector detects whether a signal is transmitted to the first interface from the subscriber terminal, and outputs the non-connection signal if a non-transmission status of the signal lasts for a predetermined time period.

3. The modem as claimed in claim 2, wherein the detector detects whether a synchronization signal is inputted for matching data transmission speed from the subscriber terminal, and generates the non-connection signal if the non-input status of the synchronization signal lasts for a predetermined time period.

4. The modem as claimed in claim 3, further comprising:
   a light-emitting device mounted on an exterior of a main body, indicating a connection status; and
   a switching device transiting on and off electric power transmitted from a power supply to the light-emitting device,
   wherein the switching device drives the transiting of the light-emitting device in correspondence with a signal outputted from the detector.

5. The modem as claimed in claim 3, wherein the first interface interfaces with the subscriber terminal in one of Ethernet, Universal Serial Bus (USB), Phoneline Network Alliance (PNA), Bluetooth, wireless LAN, and home RF protocol.

6. The modem as claimed in claim 3, wherein the first interface includes:
   a matching circuit unit matching an impedance with respect to a communication interface with the subscriber terminal; and
   an Ethernet transceiver transmitting and receiving an Ethernet data packet with the subscriber terminal.

7. The modem as claimed in claim 6, wherein the switching system is an ATM switching system, and the second interface has a modem signal processor that converts a received ATM cell to fit in a frame format required by one of the controller and the ATM switching system, said second interface outputting the converted ATM cell to a corresponding transmission path, said second interface comprising:
   a modem signal transmission/reception unit converting a digital signal received from the modem signal processor into an analog signal and outputting the analog signal to the ATM switching system, and converting an analog signal received from the ATM switching system to a digital signal and outputting the digital signal to the modem signal processor.

8. The modem as claimed in claim 1, further comprising a connector disposed in an inlet groove of a main body to connect a communication cable extended from the subscriber terminal to the first interface, wherein the detector is mounted in the inlet groove that communicates with the communication cable as the communication cable is matched to the connector, and detects a communication connection status of the subscriber terminal.

9. The modem as claimed in claim 1, wherein the second interface stops the generation of a signal that maintains a channel with the switching system if an operation stop signal is inputted from the controller.

10. The modem as claimed in claim 1, further comprising a switching device mounted on a path between the second interface and a power supply, wherein the controller controls the switching device to be transited to the off position if the non-connection signal is inputted.

11. A modem, comprising:
   a first interface interfacing with a subscriber terminal;
   a second interface interfacing with a switching system;
   a controller processing a data communication between the subscriber terminal and the switching system;

a detector detecting a communication connection status with the subscriber terminal, and outputting a connection signal or a non-connection signal according to the detection result; and a switching device transiting on and off a supply of electric power to the second interface from a power supply according to an input of the connection signal or the non-connection signal.

12. The modem as claimed in claim 11, wherein the detector detects whether a signal is transmitted to the first interface from the subscriber terminal, and outputs the non-connection signal if a non-transmission status of the signal lasts for a predetermined time period.

13. The modem as claimed in claim 12, wherein the detector detects whether a synchronization signal is inputted to match a data transmission speed from the subscriber terminal, and generates the non-connection signal if the non-input status of the synchronization signal lasts for a predetermined time period.

14. The modem as claimed in claim 12, further comprising:

a light-emitting device mounted on an exterior of a main body, indicating a connection status; and a switching device transiting on and off electric power supplied from a power supply to the light-emitting device, wherein the switching device drives the transiting on and off of the light-emitting device in correspondence with a signal outputted from the detector.

15. The modem as claimed in claim 11, wherein the first interface interfaces with the subscriber terminal in one of Ethernet, Universal Serial Bus (USB), Phoneline Network Alliance (PNA), Bluetooth, wireless LAN, and home RF.

16. The modem as claimed in claim 14, wherein the first interface includes a matching circuit unit matching an impedance with respect to a communication interface with the subscriber terminal; and an Ethernet transceiver transmitting and receiving an Ethernet data packet with the subscriber terminal.

17. The modem as claimed in claim 16, wherein the switching system is an ATM switching system, and the second interface comprises, a modem signal processor converting a received ATM cell to fit in a frame format required by the controller or the ATM switching system and outputting the converted ATM cell to a corresponding transmission path, and a modem signal transmission/reception unit converting a digital signal received from the modem signal processor into an analog signal and outputting the analog signal to the ATM switching system, and converting an analog signal received from the switching system to a digital signal and outputting the digital signal to the modem signal processor.

18. A modem, comprising:

a first interface interfacing with a subscriber terminal;

a second interface interfacing with a switching system;

a controller processing a data communication between the subscriber terminal and the switching system; and a detector detecting a communication connection status with the subscriber terminal, and outputting one of a connection signal and a non-connection signal according to the detection result, wherein the second interface stops the operation thereof if the non-connection signal is inputted from the detector and releases a communication channel with the switching system.

19. A method for controlling a modem having a first interface interfacing with a subscriber terminal, a second interface interfacing with a switching system, a detector detecting a communication connection status with the subscriber terminal, and a controller processing a data communication between the subscriber terminal and the switching system, comprising the steps of:

judging the communication connection status with the subscriber terminal; and terminating operation of the second interface if said communication connection status is judged as a non-connection status in the judging step.

20. The method as claimed in claim 19, wherein the judging step detects whether a signal is transmitted from the subscriber terminal to the first interface, and judges a connection status as a non-connection status if a non-reception status of the signal lasts for a predetermined time period.

21. The method as claimed in claim 19, wherein the judging step detects whether a synchronization signal matching a data transmission speed is inputted from the subscriber terminal, and judges a connection status as a non-connection status if a non-input status of the synchronization signal lasts for a predetermined time period.

22. The method as claimed in claim 19, wherein the terminating step terminates a supply of electric power to the second interface.

23. The method as claimed in claim 19, wherein the terminating step controls the second interface to terminate the operation thereof to maintain a channel with the switching system.

\* \* \* \* \*